United States Patent
Park et al.

(10) Patent No.: US 10,569,779 B2
(45) Date of Patent: Feb. 25, 2020

(54) COASTING NEUTRAL CONTROL APPARATUS AND METHOD ASSOCIATED WITH SPEED CAMERA

(71) Applicants: Hyundai Motor Company, Seoul (KR); Kia Motors Corporation, Seoul (KR)

(72) Inventors: Kwang-Hee Park, Suwon-si (KR); Jae-Chang Kook, Hwaseong-si (KR); Sang-Jun Park, Seoul (KR); Byeong-Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/181,615

(22) Filed: Nov. 6, 2018

(65) Prior Publication Data

US 2019/0291735 A1  Sep. 26, 2019

(30) Foreign Application Priority Data

Mar. 20, 2018 (KR) .................. 10-2018-0032216

(51) Int. Cl.
*B60W 30/18* (2012.01)
*B60W 10/10* (2012.01)
*F16H 61/02* (2006.01)

(52) U.S. Cl.
CPC ...... *B60W 30/18072* (2013.01); *B60W 10/10* (2013.01); *F16H 61/0213* (2013.01); *B60W 2030/1809* (2013.01); *B60W 2510/18* (2013.01); *B60W 2520/10* (2013.01); *B60W 2540/10* (2013.01); *B60W 2540/16* (2013.01); *B60W 2550/142* (2013.01); *B60W 2550/22* (2013.01); *B60W 2710/1005* (2013.01); *B60W 2720/10* (2013.01); *B60W 2900/00* (2013.01)

(58) Field of Classification Search
None
See application file for complete search history.

(56) References Cited

U.S. PATENT DOCUMENTS

| | | | |
|---|---|---|---|
| 2002/0007239 A1* | 1/2002 | Matsumoto | B60K 23/0808 701/41 |
| 2010/0222959 A1* | 9/2010 | Murata | B60G 17/0195 701/31.4 |
| 2018/0189683 A1* | 7/2018 | Newman | G06Q 10/02 |
| 2019/0001966 A1* | 1/2019 | Swamidason | B60W 30/04 |
| 2019/0300007 A1* | 10/2019 | Hilligardt | B60W 50/0205 |

FOREIGN PATENT DOCUMENTS

| | | |
|---|---|---|
| JP | 2012-116428 A | 6/2012 |
| JP | 2014-046713 A | 3/2014 |
| JP | 2016-164049 A | 9/2016 |
| JP | 2017-020460 A | 1/2017 |
| KR | 10-2015-0010982 A | 1/2015 |
| KR | 10-2017-0063078 A | 6/2017 |

\* cited by examiner

*Primary Examiner* — Justin Holmes
(74) *Attorney, Agent, or Firm* — Morgan, Lewis & Bockius LLP

(57) ABSTRACT

A coasting neutral control apparatus associated with a speed camera may include a communication terminal configured to acquire speed camera enforcement section information, and a controller configured to perform or interrupt coasting neutral control by determining whether a predetermined execution condition for the coasting neutral control is satisfied using the speed camera enforcement section information.

20 Claims, 4 Drawing Sheets

COASTING NEUTRAL CONTROL APPARATUS AND METHOD ASSOCIATED WITH SPEED CAMERA

CROSS-REFERENCE TO RELATED APPLICATION

The present application claims priority to Korean Patent Application No. 10-2018-0032216 filed on Mar. 20, 2018, the entire contents of which is incorporated herein for all purposes by this reference.

BACKGROUND OF THE INVENTION

Field of the Invention

The present invention relates to a coasting neutral control technique. More particularly, the present invention relates to an apparatus and a method for performing coasting neutral control by considering a speed difference between a limit speed and a current vehicle speed in addition to an existing execution condition for the coasting neutral control.

Description of Related Art

When an accelerator pedal or a brake pedal is not used while driving, a vehicle coasts by driving inertia. During coasting of the vehicle, an engine may be rotated using inertia of the vehicle without injecting fuel in a fuel cut state.

However, while the engine is rotated using inertia energy of the vehicle, the engine acts as driving resistance which consumes kinetic energy of the vehicle.

Coasting neutral control is a technology to control a transmission to enter a neutral (N) stage by releasing a clutch in the transmission in a state in which a gear shift lever is maintained at a drive (D) stage during coasting of a vehicle.

When a vehicle is traveling under coasting neutral control, fuel is consumed sufficient to maintain an idle state of an engine instead of a fuel cut state thereof to prevent starting off of the engine. However, driving resistance of the vehicle is reduced, so that a degree of deceleration of the vehicle is reduced and an available driving distance as a result of coasting is increased during coasting of the vehicle.

Therefore, when coasting neutral control is performed, the number of times an accelerator pedal is stepped on is reduced when a vehicle is traveling the same distance, and thus fuel efficiency is improved.

However, when acceleration or deceleration is required again while coasting neutral control is performed, there is a need to control of engaging a clutch, which has been released (an N stage), of a transmission again (a D stage). This is because, in the case of acceleration, engine power may be transmitted to a vehicle only when the clutch of the transmission is engaged, and in the case of deceleration by a brake, there is no need to increase a driving distance and thus it is advantageous in terms of fuel efficiency to make an engine enter in a fuel cut state.

However, since a control time is required to engage the clutch, a time delay occurs until the clutch engagement is completed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a coasting neutral control apparatus associated with a speed camera and a coasting neutral control method associated therewith, which are capable of preventing a time delay which occurs until a clutch engagement is completed in a speed camera enforcement section.

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

Provided herein are a coasting neutral control apparatus associated with a speed camera and a coasting neutral control method associated therewith, which are configured for preventing a time delay which occurs until a clutch engagement is completed.

In accordance with various exemplary embodiments of the present invention, the coasting neutral control apparatus associated with a speed camera may include a communication terminal configured to acquire speed camera enforcement section information, and a controller configured to perform or interrupt coasting neutral control by determining whether a predetermined execution condition for the coasting neutral control is satisfied using the speed camera enforcement section information.

The controller may include an acquisition module configured to acquire the speed camera enforcement section information, a determination module configured to determine whether the predetermined execution condition for the coasting neutral control is satisfied when a current section is determined as an enforcement section according to the speed camera enforcement section information, and a control module configured to perform or interrupt the coasting neutral control according to the determination result.

The speed camera enforcement section information may include limit vehicle speed information corresponding to the enforcement section.

The coasting neutral control may be performed when a difference value between the limit vehicle speed information and current vehicle speed information is smaller than a predetermined reference value.

The predetermined reference value may be determined by the product of the limit vehicle speed information and a predetermined coefficient.

The coefficient may be set according to the remaining distance to the speed camera and a gradient of the road.

The coasting neutral control may control a transmission to be neutralized by releasing a clutch in the transmission in a state in which a gear shift lever is maintained at a drive (D) stage during coasting.

When a predetermined execution prohibition condition for the coasting neutral control is satisfied in a state in which the coasting neutral control is performed, the controller may engage a clutch in a transmission before the coasting neutral control is interrupted.

The predetermined execution prohibition condition for the coasting neutral control may be satisfied when one among an acceleration pedal operation state, a brake operation state, a state in which a gear shift lever is not positioned at the D stage, a manual mode state, a state in which a vehicle speed is out of a set value, and a state in which a gradient is out of a set value is generated.

The predetermined execution condition for the coasting neutral control may be satisfied when two or more among an acceleration pedal non-operation state, a brake non-operation state, a state in which a gear shift lever is positioned at the D stage, a state in which the vehicle speed is within a set value range, and a state in which the gradient is within a set value range are generated.

In accordance with various exemplary embodiments of the present invention, a coasting neutral control method associated with a speed camera may include acquiring, by a communication terminal, speed camera enforcement section information, and performing or interrupting, by a controller, coasting neutral control by determining whether a predetermined execution condition for the coasting neutral control is satisfied using the speed camera enforcement section information.

The performing of the coasting neutral control may include acquiring, by an acquisition module, the speed camera enforcement section information, determining, by a determination module, whether the predetermined execution condition for the coasting neutral control is satisfied when a current section is determined as an enforcement section according to the speed camera enforcement section information, and performing or interrupting, by a control module, the coasting neutral control according to the determination result.

The coasting neutral control method may further include, after the coasting neutral control is performed and when a predetermined execution prohibition condition for the coasting neutral control is satisfied in a state in which the coasting neutral control is performed, engaging a clutch in a transmission before the coasting neutral control is interrupted.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
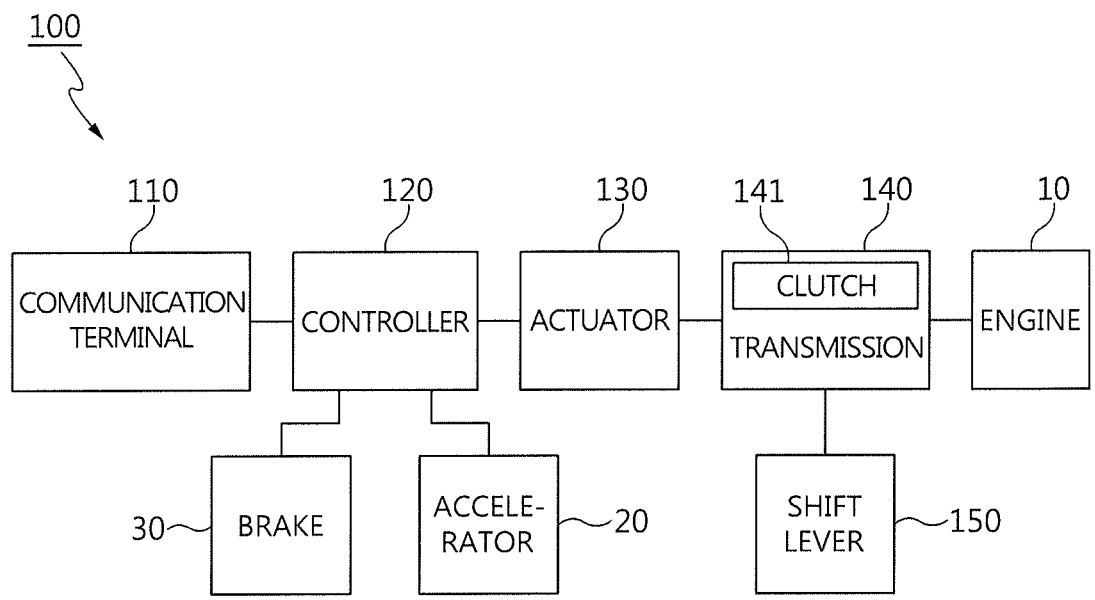
FIG. 1 is a block diagram of a configuration of a costing neutral control apparatus associated with a speed camera according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

The present invention may be modified into various forms and may have a variety of embodiments, and, therefore, specific embodiments will be illustrated in the drawings and described in detail. The embodiments, however, are not to be taken in a sense which limits the present invention to the specific embodiments, and should be construed to include modifications, equivalents, or substitutes within the spirit and technical scope of the present invention.

In describing each drawing, similar reference numerals are assigned to similar components. Although the terms "first," "second," and the like may be used herein to describe various components, these components should not be limited by these terms. The terms are used only for the purpose of distinguishing one component from another component.

For example, without departing from the scope of the present invention, a first component may be referred to as a second component, and similarly, a second component may also be referred to as a first component. The term "and/or" includes a combination of a plurality of related listed items or any item of the plurality of related listed items.

Unless otherwise defined, all terms including technical or scientific terms used herein have the same meaning as commonly understood by those skilled in the art to which the present invention pertains.

General terms that are defined in a dictionary shall be construed to have meanings that are consistent in the context of the relevant art and should not be interpreted as having an idealistic or excessively formalistic meaning unless clearly defined in the present disclosure.

Hereinafter, a coasting neutral control apparatus associated with a speed camera and a coasting neutral control method associated therewith according to an exemplary embodiment of the present invention will be described in detail with reference to the accompanying drawings.

FIG. 1 is a block diagram of a configuration of a costing neutral control apparatus 100 associated with a speed camera according to an exemplary embodiment of the present invention. Referring to FIG. 1, the costing neutral control apparatus 100 associated with a speed camera may include a communication terminal 110 configured to acquire speed camera enforcement section information, a controller 120 configured to perform or interrupt costing neutral control using the speed camera enforcement section information, an actuator 130 configured to be operated under the control of the controller 120, a transmission 140 configured to perform a gear shift according to an operation of the actuator 130, a gear shift lever 150 configured to shift gears of the transmission 140, and an engine 10 configured to supply power to the transmission 140.

The communication terminal 110 is configured to acquire speed camera enforcement section information. A navigation terminal may be used as the communication terminal 110, and alternatively, a smartphone, a note pad, or the like may be used as the communication terminal 110. Furthermore, the communication terminal 110 may acquire speed camera enforcement section information in real time through wireless communication, and alternatively, the communication terminal 110 may acquire the speed camera enforcement section information through wired communication. The speed camera enforcement section information may include limit vehicle speed information corresponding to an enforcement section. For example, a navigation terminal receives navigation information, and the navigation information may include both speed camera enforcement section information and limit vehicle speed information.

Alternatively, the limit vehicle speed information may be separately acquired from the speed camera enforcement section information.

The controller 120 determines whether a predetermined execution condition for coasting neutral control is satisfied using the speed camera enforcement section information and performs or interrupts the coasting neutral control according to the determination result.

The actuator 130 is configured to release or engage a clutch 141 configured to shift gears provided in the transmission 140 under the control of the controller 120.

The transmission 140 is configured to transfer power of the engine 10 to a driving gear (a final reduction and differential gear) configured to drive a wheel through a gear shift.

Examples of the engine 10 may include a continuous variable valve timing (CVVT) engine, a double over head camshaft (DOHC) engine, a continuous valve timing (CAT) engine, a gasoline direct injection (GAI) engine, and a multi-point injection (MPI) engine, each of which utilizes gasoline as fuel, a common rail direct injection (CRDI) engine, a high direction turbo intercooler (HTI) engine, and a variable geometry turbocharge (VGT) engine, each of which utilizes diesel as fuel, and a liquid propane injection (LPI) engine using gas as a fuel.

The gear shift lever 150 is configured to shift gear stages of the transmission 140. Furthermore, a brake 30 and an accelerator 20 are configured in the costing neutral control apparatus 100 associated with a speed camera. Alternatively, the brake 30 and the accelerator 20 may be configured to include an electronic circuit for generating an electric signal, a mechanical hydraulic structure, and the like in addition to a pedal.

Figure 2:
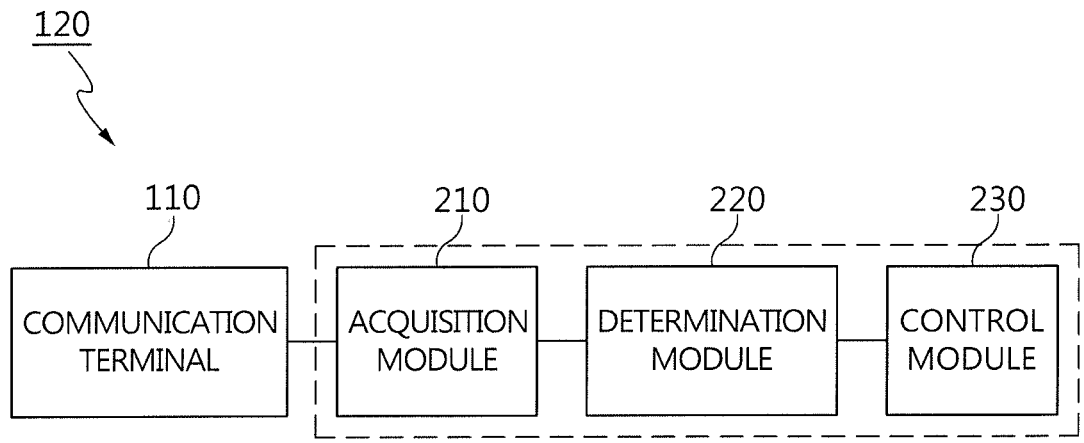
FIG. 2 is a detailed block diagram of a controller shown in FIG. 1.

FIG. 2 is a detailed block diagram of the controller 120 shown in FIG. 1.

Referring to FIG. 2, the controller 120 may include an acquisition module 210 configured to acquire speed camera enforcement section information, a determination module 220 configured to determine whether an execution condition for coasting neutral control is satisfied when a current section is an enforcement section according to the speed camera enforcement section information, and a control module 230 configured to perform or interrupt the coasting neutral control according to the determination result.

The determination module 220 determines whether the execution condition for the coasting neutral control is satisfied when the current section is the enforcement section according to the speed camera enforcement section information. Furthermore, after the coasting neutral control is performed, the determination module 220 determines whether an execution prohibition condition for the coasting neutral control is satisfied, and when the execution prohibition condition is determined as being satisfied, the determination module 220 interrupts the coasting neutral control. Examples of the execution condition and the execution prohibition condition for the coasting neutral control are as follows.

TABLE 1

| Items | Execution Condition for Coasting Neutral Control | Execution Prohibition Condition for Coasting Neutral Control |
|---|---|---|
| Acceleration/Brake | Acceleration Pedal Non-Operation State<br>Brake Non-Operation State | Acceleration Pedal Operation State<br>Brake Operation State |
| Driving Status | State in which gear shift lever is positioned at D stage<br>State in which vehicle speed is within predetermined value<br>State in which gradient is within predetermined value | State in which gear shift lever is not positioned at D stage<br>Manual mode state<br>State in which vehicle speed is out of predetermined value<br>State in which gradient is out of predetermined value |
| . . . | . . . | . . . |

In Table 1, the execution condition for the coasting neutral control an AND concept, and thus when two or more corresponding events occur, the coasting neutral control is performed.

The execution prohibition condition for the coasting neutral control is an OR concept, and thus when a single corresponding event occurs, the coasting neutral control is interrupted.

The control module 230 performs the coasting neutral control when the execution condition for the coasting neutral control is satisfied. Furthermore, the control module 230 interrupts the coasting neutral control when the execution prohibition condition for the coasting neutral control is satisfied. The coasting neutral control means that the transmission 140 is controlled to be neutralized by releasing the clutch 141 in the transmission 140 in a state in which the gear shift lever 150 is maintained at a D stage during coasting.

The term "module" in FIG. 2 means a unit configured for processing at least one function or operation, and the present unit may be implemented by hardware, software, or a combination of hardware and software. The hardware may be implemented with an application specific integrated circuit (ASIC) designed to perform the above-described functions, a digital signal processor (DSP), a programmable logic device (PLD), a field programmable gate array (FPGA), a processor, a controller, a microprocessor, another electronic device, or a combination thereof. The software may be implemented with a module for performing the above-described functions. The software may be stored in a memory device and may be executed by a processor. The memory device or the processor may employ various parts well known to those skilled in the art.

Figure 3:
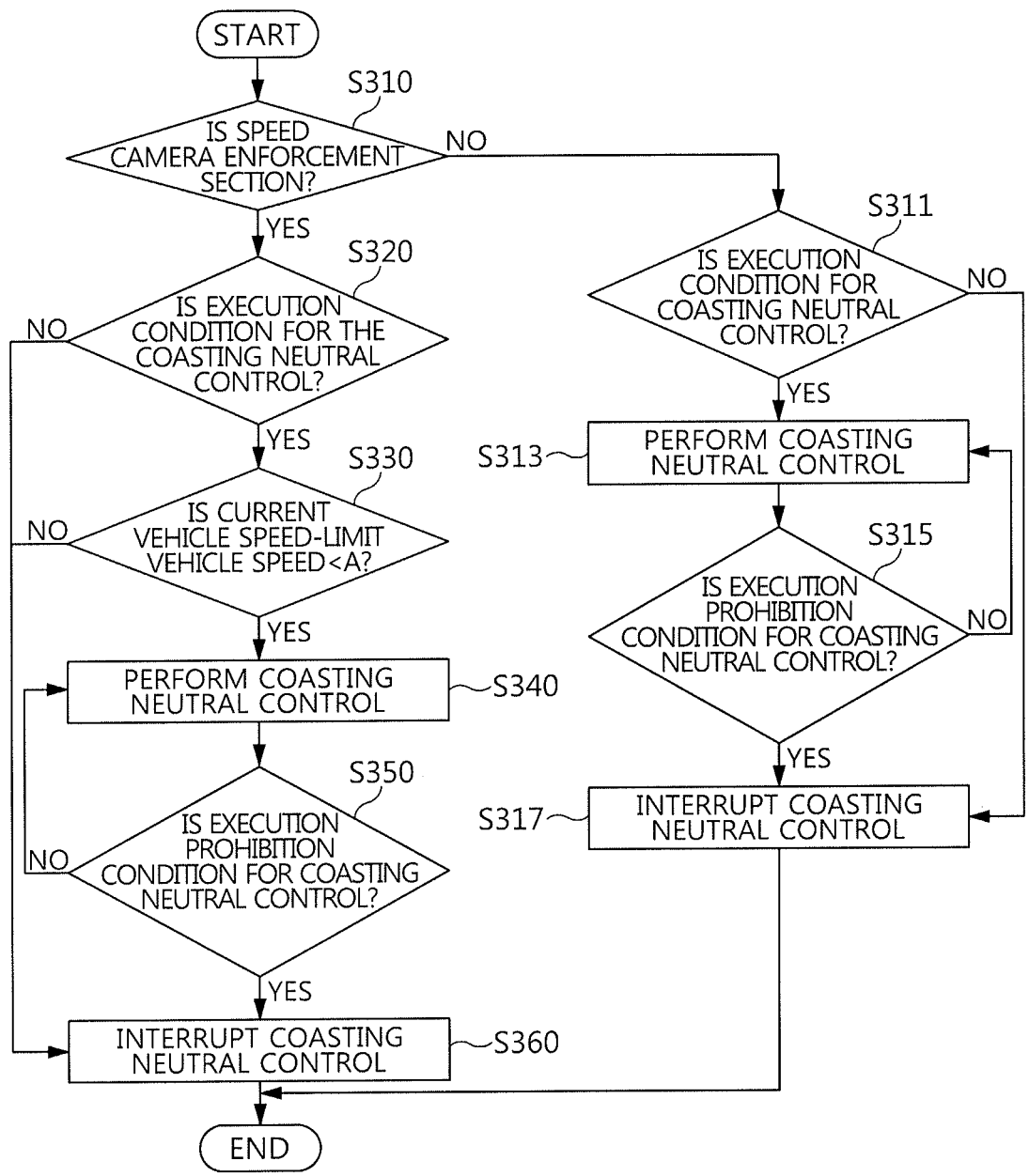
FIG. 3 is a flowchart for describing a process of costing neutral control associated with a speed camera according to an exemplary embodiment of the present invention.

FIG. 3 is a flowchart for describing a process of costing neutral control associated with a speed camera according to an exemplary embodiment of the present invention. Referring to FIG. 3, the controller 120 of FIG. 1 acquires speed camera enforcement section information from the communication terminal 110 and determines whether a vehicle is currently traveling in a speed camera enforcement section (S310).

When the vehicle is determined as not traveling in the speed camera enforcement section, the controller 120 determines whether an execution condition for coasting neutral control is satisfied (S311). When the execution condition for the coasting neutral control is determined as not being satisfied in the operation S311, the controller 120 interrupts the coasting neutral control (S317).

Otherwise, when the execution condition for the coasting neutral control is determined as being satisfied in the operation S311, the controller 120 performs the coasting neutral control (S313). After the coasting neutral control is performed, the controller 120 determines whether a current vehicle state corresponds to an execution prohibition condition for the coasting neutral control (S315). When the current vehicle state is determined as not corresponding to the execution prohibition condition for the coasting neutral control in the operation S315, the controller 120 returns to the operation S313. Otherwise, when the current vehicle state is determined as corresponding to the execution prohibition condition for the coasting neutral control in the operation S315, the controller 120 interrupts the coasting neutral control (S317).

Meanwhile, when the vehicle is determined as traveling in the speed camera enforcement section in the operation S310, the controller 120 determines whether the execution condition for the coasting neutral control is satisfied (S320). As the determination result in the operation S320, when the execution condition for the coasting neutral control is satisfied, the controller 120 determines whether a difference value between a current vehicle speed and a limit vehicle speed is smaller than a predetermined reference value A (S330). Whether to perform the coasting neutral control is additionally determined in consideration of a speed difference between a limit speed and the current vehicle speed in the speed camera enforcement section. That is, the predetermined reference value A may be a relative speed difference limit. The present predetermined reference value A may be determined by the product of the speed limit and a coefficient. For example, when a speed limit is 100 kph (=km/h) and a coefficient is 1.05, then A=5 kph may be obtained.

In an exemplary embodiment of the presently claimed invention, the A is determined by the following equation:

$$A = (\text{the speed limit} \times \text{the coefficient}) - \text{the speed limit}$$

According to the above equation, when a speed limit is 100 kph (=km/h) and a coefficient is 1.05, the A=(100 kph×1.05)−100 kph=105 kph−100 kph=5 kph.

The coefficient is already set in a table according to a remaining distance to a speed camera and a gradient of the road. This is shown in the following Table 2.

TABLE 2

| Gradient | Remaining Distance | | |
|---|---|---|---|
| | 1000 m | 500 m | 50 m |
| 0% | 1.1 | 1.05 | 1 |
| −3% | 1.05 | 1 | 1 |
| −5% | 1 | 1 | 1 |

When the difference value between the current vehicle speed and the limit vehicle speed is determined as being smaller than the predetermined reference value an in the operation S330, the controller 120 performs the coasting neutral control (S340). Otherwise, when the difference value between the current vehicle speed and the limit vehicle speed is determined as being greater than the predetermined reference value an in the operation S330, the controller 120 interrupts the coasting neutral control (S360).

After the coasting neutral control is performed, the controller 120 determines whether the current vehicle state corresponds to the execution prohibition condition for the coasting neutral control (S350). When the current vehicle state is determined as not corresponding to the execution prohibition condition for the coasting neutral control in the operation S350, the controller 120 returns to the operation S340. Otherwise, when the current vehicle state is determined as corresponding to the execution prohibition condition for the coasting neutral control in the operation S350, the controller 120 interrupts the coasting neutral control (S360).

When acceleration or deceleration of the vehicle is required again while the coasting neutral control is performed, there is a need to control of engaging a clutch, which has been released (an N stage), of a transmission (a D stage) again. This is because, in the case of acceleration, engine power may be transmitted to a vehicle only when the clutch of the transmission is engaged, and in the case of deceleration by a brake, there is no need to increase a driving distance and thus it is advantageous in terms of fuel efficiency to make an engine enter in a fuel cut state. However, since a control time is required to engage the clutch, a time delay occurs until the clutch engagement is completed.

To prevent such a time delay, the present invention predicts a situation in which a driver operates an accelerator pedal or a brake pedal in front of a speed camera and engages the clutch in the transmission in advance in a state of the coasting neutral control.

Figure 4:
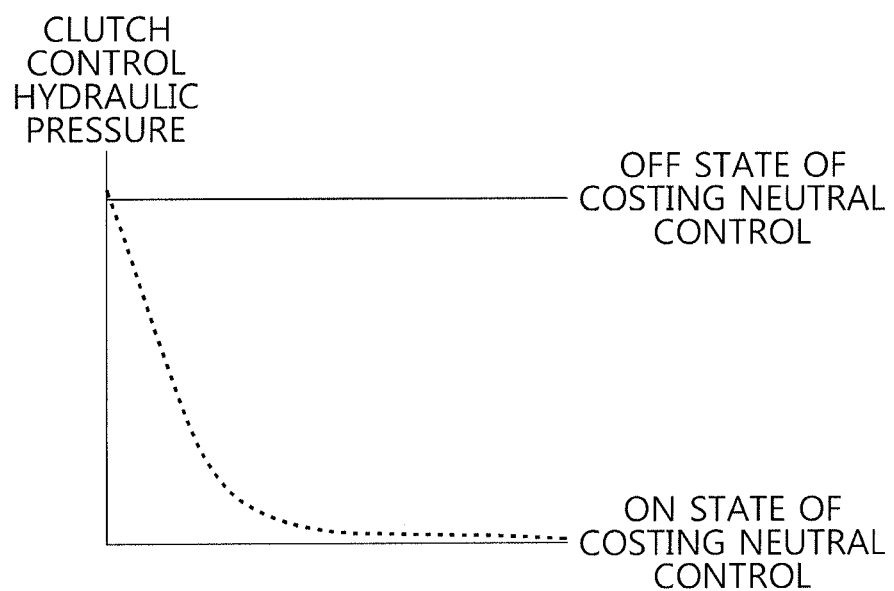
FIG. 4 is a graph showing a concept of general costing neutral control.

FIG. 4 is a graph showing a concept of general costing neutral control. Referring to FIG. 4, when the costing neutral control is in an OFF state, a clutch control hydraulic pressure is kept constant at a high level. On the other hand, when the coasting neutral control is in an ON state, the clutch control hydraulic pressure rapidly drops to a low level from the high level. That is, the coasting neutral control means that a transmission is controlled to be neutralized (an N stage) by releasing a clutch in the transmission in a state in which a gear shift lever is maintained at a D stage during coasting.

Figure 5:
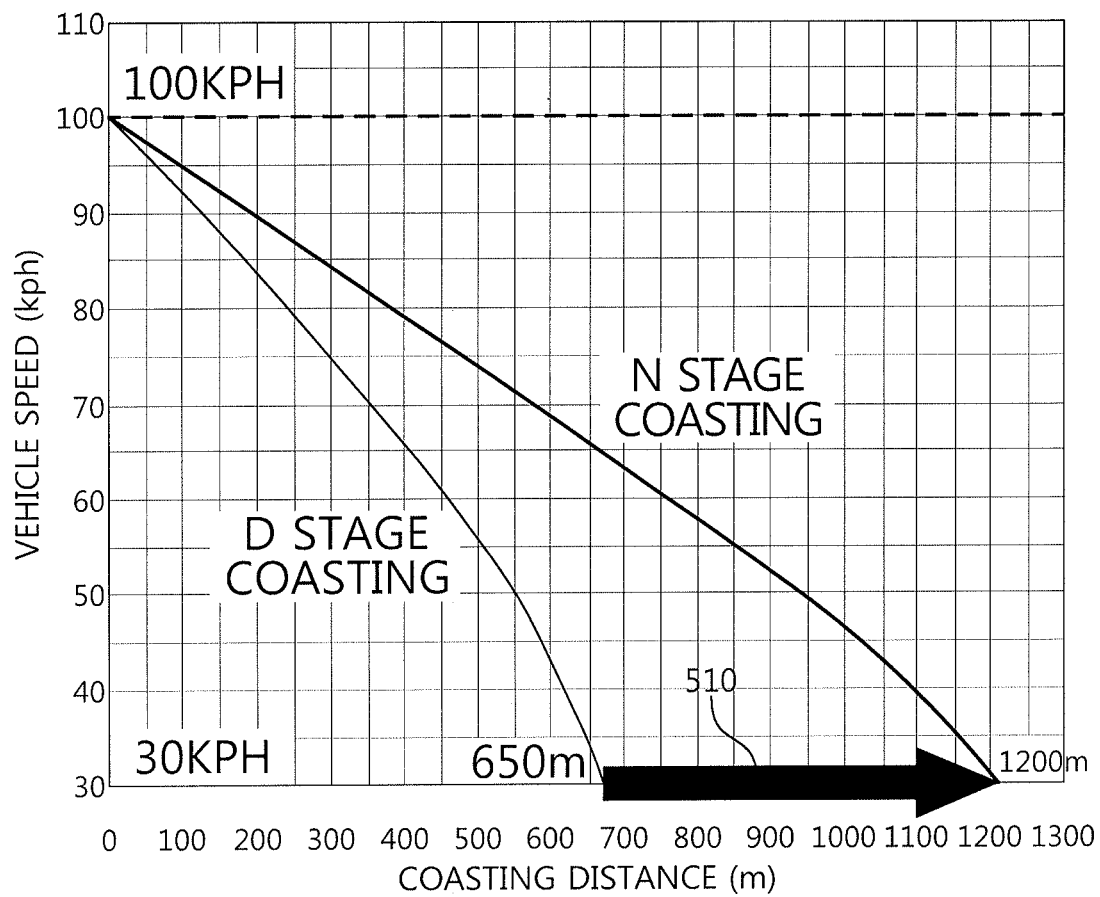
FIG. 5 is a graph for comparing coasting distances at a neutral (N) stage and a drive (D) stage of a gear shift lever in the general course neutral control.

FIG. 5 is a graph for comparing coasting distances for an N stage and a D stage of a gear shift lever in the general course neutral control. Referring to FIG. 5, a coasting distance in N stage costing (that is, the coasting neutral control) is longer about twice than that in D stage costing. Therefore, a frequency of re-acceleration for maintaining a vehicle speed is reduced, and thus fuel efficiency is improved. When the coasting neutral control is performed, the number of times an accelerator pedal is stepped on is reduced when a vehicle is traveling the same distance, and thus fuel efficiency is improved.

In accordance with various aspects of the present invention, there is an effect in that a deceleration intent of a driver is predicted according to a difference between a limit speed set in a speed camera and a current vehicle speed, and a relative position between the speed camera and a vehicle, and whether to maintain or interrupt coasting neutral control is determined, so that the coasting neutral control may be effectively performed.

Furthermore, in accordance with various aspects of the present invention, there is another effect in that, when a braking operation is predicted in a speed camera enforcement section, the coasting neutral control is interrupted in advance to increase a driving time of the vehicle in a fuel cut state, so that fuel efficiency may be achieved.

Furthermore, in accordance with various aspects of the present invention, there is yet another effect in that, since a decrease in vehicle speed increases when the vehicle is traveling in a fuel cut state rather than in a state of the coasting neutral control, the number of times of a brake operation may be reduced.

Furthermore, in accordance with various aspects of the present invention, there is yet another effect in that a timing for interrupting the costing neutral control may be adjusted according to the difference between the limit speed and the current vehicle speed, a remaining distance to the speed camera, and a gradient of the road, so that marketability of the vehicle may be increased when the coasting neutral control is performed in a speed camera enforcement section.

Furthermore, the operations of the method or algorithm described in connection with the exemplary embodiments included herein may be implemented in a form of a program command which is executable through various computer means and may be recorded in a computer-readable medium. The computer-readable medium may include program (command) codes, data files, data structures, and the like in alone or a combination thereof.

The program (command) codes recorded in the computer-readable medium may be specially designed and configured for the exemplary embodiment or may be available to those skilled in the computer software. Examples of the computer-readable recording medium may include magnetic media such as a hard disk, a floppy disk, a magnetic tape, and the like, optical media such as a compact disc read only memory (CD-ROM), a digital versatile disc (DVD), a blu-ray disc, and the like, and semiconductor memory devices, which are configured to store and execute program (command) codes, such as a ROM, a RAM, a flash memory, and the like.

Here, examples of the program (command) codes include machine language codes generated by a compiler, as well as high-level language codes which are executable by a computer using an interpreter or the like. The above-described hardware devices may be configured to operate as one or more software modules to perform an operation of the present invention, and vice versa.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coasting neutral control apparatus associated with a speed camera, the coasting neutral control apparatus comprising:
    a communication terminal configured to acquire speed camera enforcement section information; and
    a controller engaged to the communication terminal and configured to perform or interrupt coasting neutral control of a vehicle by determining when a predetermined execution condition for the coasting neutral control is satisfied using the speed camera enforcement section information.

2. The coasting neutral control apparatus of claim 1, wherein the controller includes:
    an acquisition module configured to acquire the speed camera enforcement section information from the communication terminal;
    a determination module configured to determine when the predetermined execution condition for the coasting neutral control is satisfied when a current section is determined as an enforcement section according to the speed camera enforcement section information; and
    a control module configured to perform or interrupt the coasting neutral control according to a result of the determining of when the predetermined execution condition for the coasting neutral control is satisfied, in the determination module.

3. The coasting neutral control apparatus of claim 2, wherein the speed camera enforcement section information includes limit vehicle speed information corresponding to the enforcement section.

4. The coasting neutral control apparatus of claim 3, wherein the coasting neutral control is performed when a difference value between the limit vehicle speed information and current vehicle speed information is smaller than a predetermined reference value.

5. The coasting neutral control apparatus of claim 4, wherein the predetermined reference value is determined by a product of the limit vehicle speed information and a predetermined coefficient.

6. The coasting neutral control apparatus of claim 5,
    wherein the limit vehicle speed information includes a speed limit, and
    wherein the predetermined reference value is determined by an equation:

$$A = (\text{the speed limit} \times \text{the predetermined coefficient}) - \text{the speed limit},$$

wherein the A is the predetermined reference value.

7. The coasting neutral control apparatus of claim 5, wherein the predetermined coefficient is set according to relationship between a remaining distance of the vehicle to the speed camera and a gradient of a road.

8. The coasting neutral control apparatus of claim 1, wherein the coasting neutral control controls a transmission to be neutralized by releasing a clutch in the transmission while a gear shift lever is maintained at a drive (D) stage during coasting.

9. The coasting neutral control apparatus of claim 1, wherein, when a predetermined execution prohibition condition for the coasting neutral control is satisfied while the coasting neutral control is performed, the controller engages a clutch in a transmission before the coasting neutral control is interrupted.

10. The coasting neutral control apparatus of claim 9, wherein the predetermined execution prohibition condition for the coasting neutral control is satisfied when one among an acceleration pedal operation state, a brake operation state, a state in which a gear shift lever is not disposed at a drive (D) stage, a manual mode state, a state in which a vehicle speed is beyond a set value, and a state in which a gradient of a road is beyond a set value, is generated.

11. The coasting neutral control apparatus of claim 1, wherein the predetermined execution condition for the coasting neutral control is satisfied when at least two among an acceleration pedal non-operation state, a brake non-operation state, a state in which a gear shift lever is disposed at a drive (D) stage, a state in which a vehicle speed is within a set value range, and a state in which a gradient of a road is within a set value range are generated.

12. A coasting neutral control method associated with a speed camera, the coasting neutral control method comprising:
acquiring, by a communication terminal, speed camera enforcement section information; and
performing or interrupting, by a controller, coasting neutral control of a vehicle by determining when a predetermined execution condition for the coasting neutral control is satisfied using the speed camera enforcement section information received from the communication terminal.

13. The coasting neutral control method of claim 12, wherein the performing of the coasting neutral control includes:
acquiring, by an acquisition module, the speed camera enforcement section information;
determining, by a determination module, when the predetermined execution condition for the coasting neutral control is satisfied when a current section is determined as an enforcement section according to the speed camera enforcement section information; and
performing or interrupting, by a control module, the coasting neutral control according to a result of determining, by the determination module, when the predetermined execution condition for the coasting neutral control is satisfied.

14. The coasting neutral control method of claim 12, wherein the speed camera enforcement section information includes limit vehicle speed information corresponding to the enforcement section.

15. The coasting neutral control method of claim 14, further including:
performing the coasting neutral control when a difference value between the limit vehicle speed information and current vehicle speed information is smaller than a predetermined reference value.

16. The coasting neutral control method of claim 15, wherein the predetermined reference value is determined by a product of the limit vehicle speed information and a predetermined coefficient.

17. The coasting neutral control method of claim 16, wherein the predetermined coefficient is set according to relationship between a remaining distance of the vehicle to the speed camera and a gradient of a road.

18. The coasting neutral control method of claim 12, wherein the coasting neutral control controls a transmission to be neutralized by releasing a clutch in the transmission while a gear shift lever is maintained at a drive (D) stage during coasting.

19. The coasting neutral control method of claim 12, further including:
after the coasting neutral control is performed and when a predetermined execution prohibition condition for the coasting neutral control is satisfied while the coasting neutral control is performed, engaging a clutch in a transmission before the coasting neutral control is interrupted.

20. The coasting neutral control method of claim 19, wherein the predetermined execution prohibition condition for the coasting neutral control is satisfied when one among an acceleration pedal operation state, a brake operation state, a state in which a gear shift lever is not disposed at a drive (D) stage, a manual mode state, a state in which a vehicle speed is beyond a set value, and a state in which a gradient of a road is beyond a set value, is generated.

* * * * *